United States Patent Office 3,489,144
Patented Jan. 13, 1970

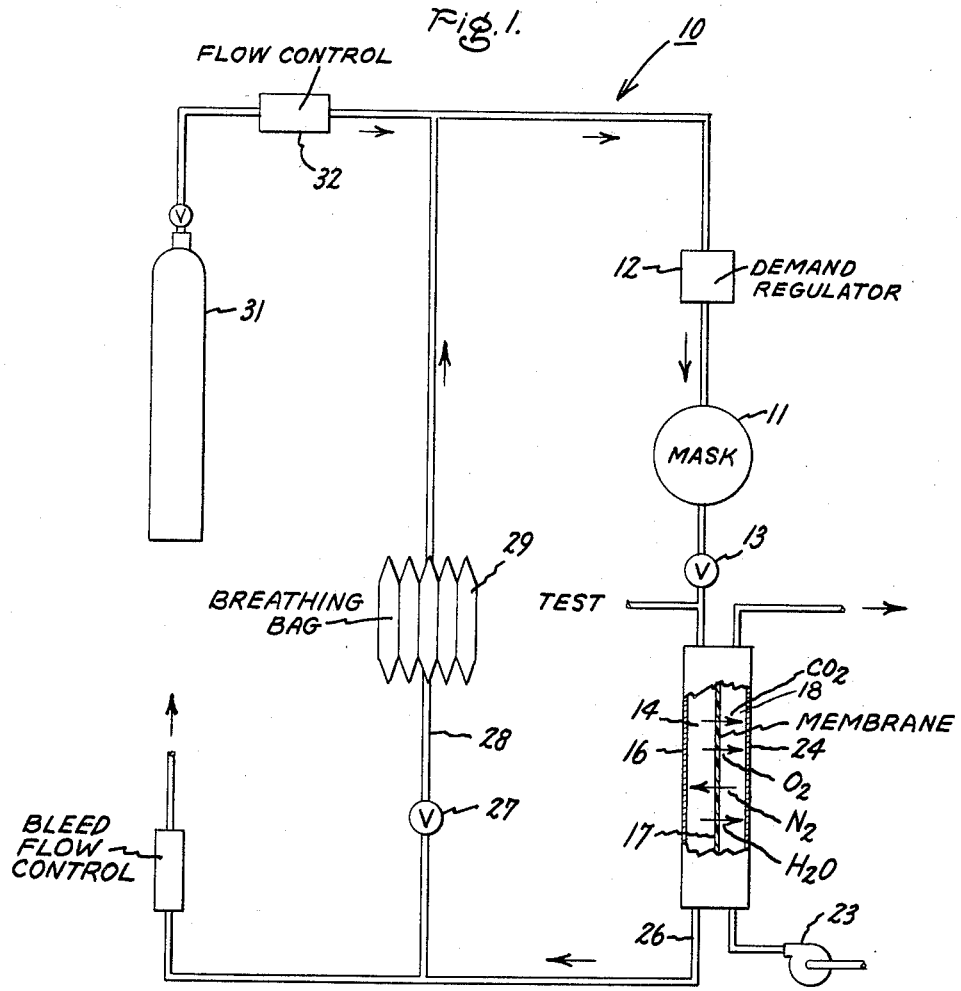

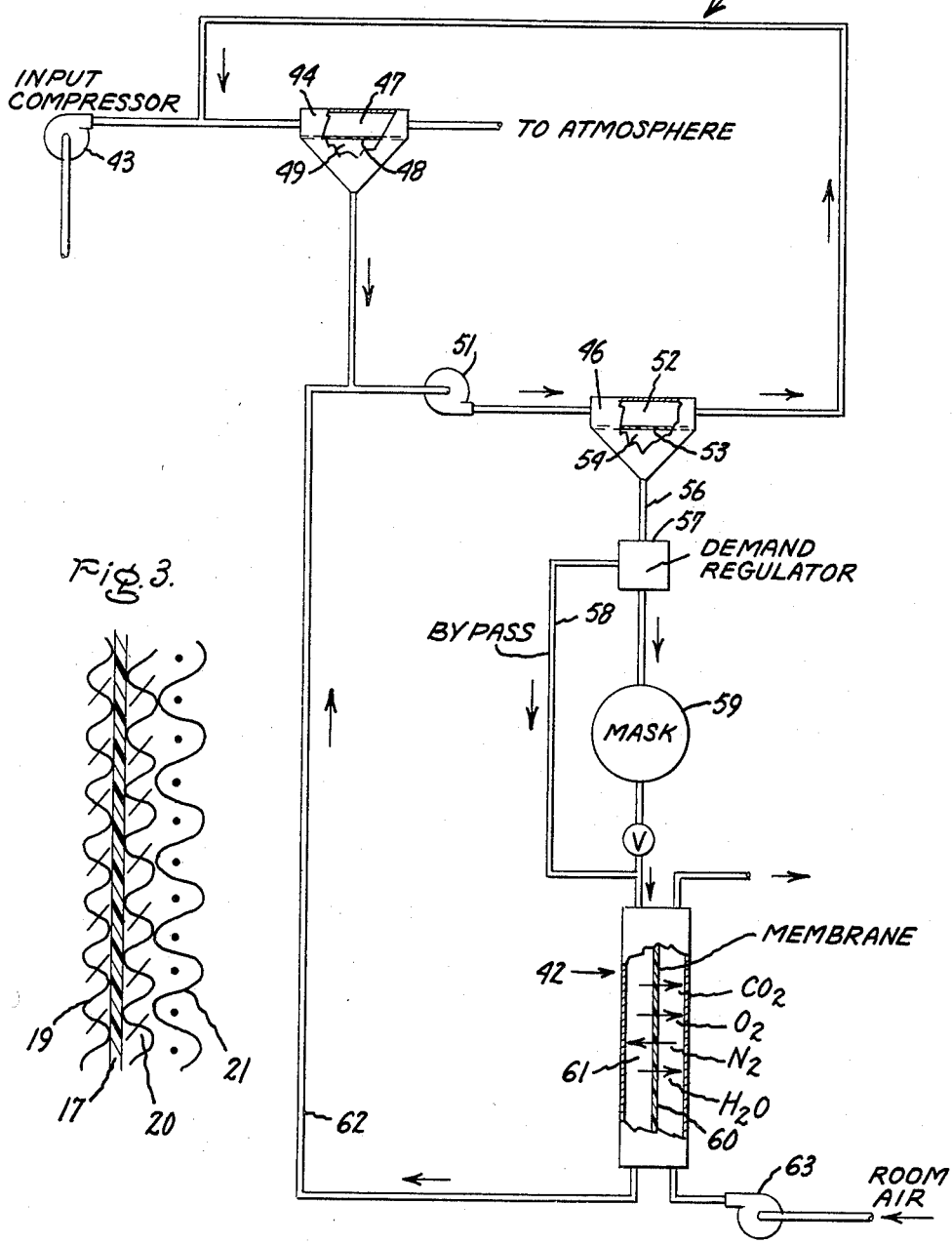
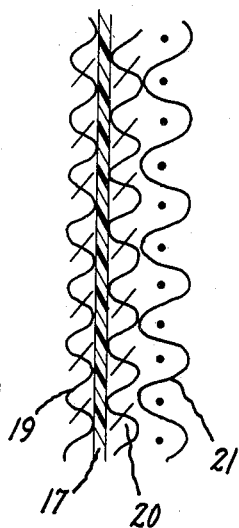

3,489,144
CLOSED REBREATHER - RESPIRATOR CIRCUIT FOR RENOVATION AND SUPPLY OF OXYGEN/NITROGEN GAS MIXTURE
Norman R. Dibelius, Ballston Spa, and Angelo Dounoucos, Schenectady, N.Y., assignors to General Electric Company, a corporation of New York
Filed Feb. 13, 1967, Ser. No. 615,582
Int. Cl. A62b 7/02, 7/04
U.S. Cl. 128—142.2      5 Claims

ABSTRACT OF THE DISCLOSURE

A system is presented for the distribution of oxygen to, and removal of exhaled gases from, a respirator in which system a device having permeable, non-porous wall area is incorporated in order to reduce the content of carbon dioxide and/or water vapor of the exhaled gases, which gases are then recycled.

---

The invention has particular utility in extending the capabilities of any given oxygen supply being used to support respiration, the improvement being more specifically the incorporation of a "rebreather unit" into the supply system the "rebreather unit" being a device wherein by means of a permeable membrane the carbon dioxide and/or water vapor are purged from the exhaled gases leaving the respirator. These gases still contain a very high percentage of oxygen, after being purged, and may beneficially be returned to the system to be upgraded for eventual readmission to the respirator.

Thus, this invention is of particular utility in those instances in which gas of augmented oxygen content is supplied to persons under medical care, to individuals living or traveling at high altitudes, or to persons operating in a hazardous atmosphere. The exhaled gases leaving the respirator contain a very high percentage of oxygen along with the waste products of respiration. The contaminating materials (carbon dioxide and water vapor) in the exhaled gases are actually present in relatively small concentration. However, the concentration is high enough so that continued rebreathing thereof, particularly as to carbon dioxide, would constitute a health hazard. Therefore, reuse of this very large amount of exhaled oxygen is impossible unless the carbon dioxide content thereof is first reduced to a safe level. Various proposals have been made for treating such exhaust air to effect removal of the carbon dioxide, as for example by absorption; however, these proposals have, in general, required an inordinate amount of maintenance and entailed such significant cost as to make it more feasible to simply vent the exhaled gases to the atmosphere. The venting of these exhaled gases directly to the atmosphere has become more common, of course, as the price of oxygen as a commodity has been reduced.

It is, therefore, an object of this invention to provide a simple, efficient and reliable respiration apparatus wherein exhaled gas containing a substantial amount of oxygen contaminated by the presence of more than about 1% by volume of carbon dioxide gas is reconstituted by the removal of carbon dioxide gas in excess of about 1% by volume to produce a gas easily upgraded by the addition of oxygen to afford a viable atmosphere.

It is another object of this invention to considerably augment the longevity of contained oxygen supplies for life support by simply and effectively removing carbon dioxide from the gases expired during the respiratory process and adding oxygen thereto at least sufficient to replace that oxygen consumed biologically.

Briefly stated, the above objects are realized by providing in combination with a respirator to which a viable atmosphere (substantial oxygen content, low carbon dioxide content gas) is supplied at some desired rate (a) a chamber in communication with the respirator exhaust vent having as a significant portion of the wall area thereof a permeable, non-porous membrane; (b) means for reducing the concentration of carbon dioxide gas and/or water vapor in the environment immediately adjacent the outside surface of the membrane wall, and (c) conduit means in communication with said chamber for recirculating refurbished gas to the respirator, after augmenting the oxygen content thereof. Conventional means, such as baffles, may be supplied within the aforementioned chamber to minimize short-circuiting of the flow and thereby insure sufficient residence time in the chamber.

For purposes of illustration the discussion herein is directed to a single chamber, however, in a practical construction a number of smaller chambers arranged in parallel would be employed to supply the necessary membrane area in a compact volume.

The exact nature of this invention as well as other objects and advantages thereof will be readily apparent from consideration of the following specification relating to the annexed drawing in which:

FIG. 1 is a schematic diagram of an oxygen conservation unit constructed in accordance with this invention and incorporating therein the rebreather device of this invention;

FIG. 2 is a schematic representation of the oxygen conservation unit of this invention arranged in combination with an oxygen generator in place of the contained oxygen supply of the apparatus of FIG. 1, and FIG. 3 is an enlarged view in cross-section of the permeable membrane composite wall of the rebreather unit.

The breathing apparatus 10 shown in FIG. 1 is an arrangement such as can be effectively employed to provide an oxygen-enriched inhalant to a patient, as for example in an army field hospital, where the replacement of oxygen tanks may pose a serious logistics problem. Thus, this development is of particular importance in reducing the weight and volume of the contained oxygen supply required to adequately meet demands for patient survival.

A man ordinarily inhales approximately 7 to 10 liters of atmospheric air per minute, which air contains 21% oxygen and 79% nitrogen. From this amount approximately 0.35–0.40 liter/minute of oxygen passes into the blood stream and approximately the same quantity of carbon dioxide passes out of the blood stream and is exhaled along with the unused oxygen and nitrogen. Thereafter, the composition (dry volume) of the exhaled gas mixture in this case becomes approximately 15.8% oxygen, 79% nitrogen, 5.2% $CO_2$ plus water vapor in variable amounts. If the gas mixture to be inhaled were to be oxygen-enriched to a composition of about 50% oxygen and 50% nitrogen as is common in the case of a hospital patient, the exhalant would have an approximate composition (dry volume) of 45.6% oxygen, 49.1% nitrogen and 5.3% $CO_2$ plus water vapor in variable amounts. Thus, for an individual inhaling a mixture of about 50% oxygen and 50% nitrogen through a mask and exhaling to the atmosphere, about nine times as much oxygen would be lost in the exhalant as is actually used by that individual. In spite of this fact such oxygen-rich exhalant has usually been vented to the atmosphere, because of the unavailability in the past of effective means for economically reclaiming this oxygen by removing carbon dioxide and water vapor therefrom.

A device filling this need is shown in FIG. 1, wherein an oxygen-enriched gas mixture is supplied to a patient, the gas entering the respirator, mask 11, through a demand regulator 12. In a typical situation, the patient would be provided with a mixture containing (by volume) approximately 50% $O_2$ and 50% $N_2$. Upon recirculation to the patient in the manner described below, this mixture would have a composition of about 49.5% $O_2$, 49.5% $N_2$ and 1% $CO_2$ (the relative humidity thereof would be the same as that of the ambient air). As the patient inhales, backflow of the exhalant into the intake tube is prevented by check valve 13. The gas (about 45.6% $O_2$, 49.1% $N_2$, 5.3% $CO_2$ (dry volume and having a relatively high humidity) exhaled by the patient leaves mask 11 without contact with gas being inhaled and passes into the permselective rebreather closed chamber 14 of rebreather unit 16, wherein in the construction shown substantially all of the area of one wall comprises permeable membrane 17.

The term "permselective" is used herein as an expression of the unique property of selective permeability possessed by certain organic membrane materials. This term does not imply that there is passage of one gas through the membrane to the complete exclusion of other gases, but does indicate that a difference exists in the flow rate of various molecular species through a permeable membrane. This behavior is in distinct contrast to the behavior of porous material, such as paper. The mechanism by which gas or vapor passes through a permeable membrane is not a simple diffusion process such as may be the case with a porous material, but rather, is one in which the gas actually dissolves in the membrane, diffuses therethrough, and then leaves the membrane in the gaseous form from the other side.

The driving force for effecting gas transfer through the membrane 17 is the difference in partial pressure with respect to the gaseous component in question. Thus, in the situation presented herein no large amount of reliance need be placed upon the lung power of the patient to create a gross pressure differential although such a gross pressure differential would also serve to provide the requisite driving force. The exhaled gases leaving mask 11 will have a significantly larger concentration of carbon dioxide and water vapor (and, therefore, have a greater partial pressure) than exists in the ambient (open-ended chamber 18). This significant difference in partial pressure (amounting to about 33 mm. of mercury) is responsible for the conduct of the transfer mechanisms of solution and diffusion conveying both carbon dioxide gas and water vapor from the closed chamber 14 through membrane 17 to chamber 18 to become part of the ambient atmosphere. The effectiveness of separation will, of course, depend upon selecting a permselective membrane material having uniquely high permeabilities for carbon dioxide and water vapor relative to the permeabilities of oxygen and nitrogen. Further, the film material selected should be one that can be manufactured in thicknesses of the order of less than two mils and in films free of pin holes and of substantially uniform thickness.

Silicone rubber is uniquely suited to this purpose and a method for the preparation of very thin, substantially defect-free organopolysiloxane films is disclosed in U.S. application Ser. No. 466,698—Robb (now U.S. Patent 3,325,330), filed June 24, 1965. The portions of said application describing methods for the preparation of such films in substantially uniform thicknesses of less than about two mils are incorporated herein by reference.

Since the membrane 17 is preferably of a thickness in the order of about 1 mil or less it should be supported against rupture, particularly to enable handling during assembly. The general durability of such material is increased by the application thereto of backup materials such as open-mesh cloths 19, 20 (FIG. 3) shown disposed on opposite sides of film 17, each having a thickness of from about 2–10 mils. In addition, more rigid support as would be supplied by screen 21, is required. Screen 21 would have a mesh size (U.S. Sieve) ranging from about 10–50. In those arrangements in which a sharp reversal in pressure must be tolerated, screens may be employed on both sides of the membrane. Design conditions may, of course, require using different weights and thicknesses for cloths, or mats, 19, 20.

The purpose of the backing 19, 20 which contacts the screen is to support the film 17 on the screen 21 and to improve handling qualities. This backing necessarily has a small pore size. The backing layer 20 is primarily to prevent mechanical abrasion and can be a cloth of much more open mesh.

Considerable care must be taken in sealing the perimeter of membrane 17 as only a very small leakage rate can be tolerated.

Circulating means, such as blower 23, should be provided to continuously scrub away the ambient gaseous atmosphere adjacent the outer surface of membrane 17. In the absence of such circulation the gas residing immediately adjacent the membrane surface tends to increase rapidly in carbon dioxide gas content and in water vapor content. Such an increase would have the effect of decreasing the partial pressure difference, which the membrane "sees." In the case of such equipment serving a hospitalized patient, room air is circulated through open-ended chamber 18 between wall 24 and membrane 17 to scrub the air rich in carbon dioxide gas and water vapor from the surface of membrane 17.

Using a film structure prepared with the materials and film thickness described hereinabove, a residence time for the gases in chamber 14 of at least about 30 seconds should be sufficient to satisfactorily reduce the carbon dioxide gas and water vapor content of the exhaled gas mixture before the refurbished mixture leaves chamber 14 by way of conduit 26 for recirculation and reuse.

During the residence time of the exhaled gases in chamber 14, not only do carbon dioxide gas and/or water vapor leave, but a certain amount of oxygen also passes out through membrane 17 and is lost from the system. At the same time the nitrogen partial pressures are such that a certain amount of nitrogen is constantly entering chamber 14 through membrane 17. Oxygen loss in this fashion can be reduced, of course, by properly selecting the membrane material for membrane 17 such that the $CO_2$ and $H_2O$ removal occurs as quickly as possible relative to $O_2$ penetration. In those instances in which it is preferable to retain the relative humidity at a high level in the breathing gas (as in the case of an anesthesia rebreather), this can be done by employing a high humidity scrubbing gas. Flow control valve 27 is provided to bleed part of the reconstituted gas mixture (about 61% nitrogen, 38% oxygen and 1% carbon dioxide, dry volume) is bled from the system at a rate calculated to keep the increase in nitrogen content in check. This bleeding action has considerably more effect on the nitrogen content than on the oxygen or carbon dioxide content of the gas mixture. The balance of the purged gas mixture is recirculated via conduit 28 to flexible breathing bag 29. As gas mixture leaves breathing bag 29 it is enriched with make-up oxygen gas from an oxygen source, as for example, oxygen bottle 31 with the rate of addition being controlled by the setting of flow control valve 32. Having been restored to the desired proportions, as for example (dry volume) 49.5% $O_2$, 49.5% $N_2$ and 1% $CO_2$, the renovated gas mixture is then conducted to demand regulator 12 for recirculation to mask 11.

The criteria for selecting useful membrane materials are the following:

(a) A $CO_2/O_2$ permeability ratio (permeability to $CO_2$ divided by the permeability to $O_2$) greater than 5:1;

(b) absolute permeability to $CO_2$ in excess of about $$200 \times 10^{-9} \frac{\text{cc. NTP-cm.}}{\text{sec.-cm.}^2\text{-cm. Hg}\Delta P}$$

(NTP being the abbreviation for "normal temperature and pressure"); and (c) the absolute permeability to water being greater than $$3000 \times 10^{-9} \frac{\text{cc. NTP-cm.}}{\text{sec.-cm.}^2\text{-cm. Hg}\Delta P}$$

if humidity control is desired.

Two membrane materials meeting these criteria are dimethylsilicone rubber and immobilized liquid membranes, such as the modified cellulosic ester films described in U.S. application Ser. No. 572,222—Ward et al. (now U.S. Patent 3,396,510), filed Aug. 15, 1966. The preparation and properties of such membranes as set forth therein is incorporated by reference. A specific example of the latter is cellulose acetate film impregnated with a solution of alkali bicarbonate, as for example, cesium bicarbonate. The modified cellulosic ester films must be kept at a relative humidity of at least 75% in order to insure that these membranes do not dry out. For this reason in those applications in which it is feasible to maintain the requisite relative humidity the cellulose acetate film impregnated with cesium bicarbonate solution is preferred, because of the very high $CO_2/O_2$ separation factor. Should it be impractical or impossible to maintain the condition of 75% relative humidity, the dimethylsilicone membrane is preferred. Other, membrane constructions and materials meeting the above criteria may be discovered, in which case such new membranes will also be useful in the practice of this invention.

Using 1 mil thick dimethylsilicone rubber for membrane 17, the partial pressure of $CO_2$ is reduced from about 39 mm. of mercury [5.3% $CO_2$ entering chamber 14] to about 7.6 mm. of mercury [1% $CO_2$ in purged gas mixture leaving chamber 14], as carbon dioxide gas passes at a permeation rate of about .35 liter/min. to the room side of the membrane where the partial pressure of $CO_2$ is about 0.76 mm. of mercury (0.1% $CO_2$). A small blower 23 having a 10–15 c.f.m. capacity will provide sufficient vigorous air circulation to sweep away emerging gases over a membrane area large enough to service an adult human engaged in normal activity. With the flows recited, the partial pressure of oxygen in chamber 14 would be approximately 335 mm. of mercury, while the partial pressure of oxygen in the ambient is about 10 mm. of mercury. Thus, with an area of silicone rubber membrane 17 and partial pressure conditions such that carbon dioxide is leaving chamber 14 at a permeation rate of about 0.35 liter/min., oxygen will also leave at the rate of about 0.58 liter/min. Similarly, since the nitrogen partial pressure is approximately 593 mm. of mercury in the room and approximately 361 mm. of mercury within chamber 14, about 0.27 liter/min. of nitrogen will pass through membrane 17 in the opposite direction and enter chamber 14. To prevent nitrogen gas from building up in multiple passes of the gas stream through the system, the above-described bleeding of the system at valve 27 is accomplished. With the gas flows and purging action described about 0.27 liter/min. of nitrogen accompanied by 0.21 liter/min. of oxygen and 0.005 liter/min. of $CO_2$ would be bled from the system.

Water vapor passes through silicone membrane 17 so readily that the relative humidity on either side of membrane 17 reaches equilibrium very quickly. The composition of the gas mixture with the gas flows considered hereinabove as corrected by bleeding is about 42.7% oxygen, 55.7% nitrogen and 1.6% carbon dioxide. Before being recirculated to the patient it is necessary to refurbish this gas mixture en route by the addition of oxygen (1.189 liters/min.) thereto to make up for the amount biologically consumed, the amount lost in bleeding and the amount lost through membrane 17. After enrichment in this manner the percentages of the gas mixture are returned to the selected composition for breathing by the patient, which in this exemplary description is (dry volume) about 49.5% oxygen, 49.5% nitrogen and 1% carbon dioxide. Other ratios of gases may be used as befits the circumstance, of course.

The benefits of incorporating rebreather unit 16 into the system illustrated is shown by the fact that, if the gas exhaled by the patient were simply vented to the room (atmosphere), the required oxygen flow from bottle 31 would have to be about 5 liters/minute. By introducing rebreather 16 using the dimethylsilicone film this oxygen demand is reduced to 1.189 liters/min., thereby providing a reduction in the oxygen actually used of about 76%. In addition to the reduction in expense so afforded, the problem of supplying oxygen to remote locations as would be the case for a field hospital would likewise, be reduced by the 76%. If, instead of the dimethylsilicone membrane, the modified cellulose acetate film is employed, the loss of oxygen can be further reduced to provide a reduction in the order of 90%.

The values of permeabilities for dimethylsilicone rubber have been set forth in Table I.

TABLE I

| Gas | P.r. $\frac{\text{cc. NTP-cm.}}{\text{sec.-cm.}^2\text{-cm. Hg}\Delta P}$ |
|---|---|
| Nitrogen | $28 \times 10^{-9}$ |
| Helium | $35 \times 10^{-9}$ |
| Oxygen | $60 \times 10^{-9}$ |
| Hydrogen | $66 \times 10^{-9}$ |
| Carbon dioxide | $320 \times 10^{-9}$ |
| Freon 11 | $1500 \times 10^{-9}$ |
| Freon 12 | $138 \times 10^{-9}$ |
| Methane | $94 \times 10^{-9}$ |
| Ethane | $250 \times 10^{-9}$ |
| Propane | $410 \times 10^{-9}$ |
| n-Butane | $900 \times 10^{-9}$ |
| n-Propane | $2000 \times 10^{-9}$ |
| n-Hexane | $940 \times 10^{-9}$ |
| n-Octane | $860 \times 10^{-9}$ |
| n-Decane | $430 \times 10^{-9}$ |
| Ethylene | $135 \times 10^{-9}$ |
| Benzene | $1910 \times 10^{-9}$ |
| Phenol | $1080 \times 10^{-9}$ |
| Toluene | $913 \times 10^{-9}$ |
| Pyridene | $2100 \times 10^{-9}$ |
| Acetone | $1980 \times 10^{-9}$ |
| Ammonia | $586 \times 10^{-9}$ |
| Water | $3800 \times 10^{-9}$ |
| Hydrogen sulfide | $650 \times 10^{-9}$ |

A similar respirating arrangement can be advantageously employed for the supply of oxygen to individuals in the earth's atmosphere, but at high altitudes, as for example in high flying aircraft. The supply rates, bleeding rates and permeation rates would be different, of course, from the device described hereinabove, for which calculations were made at normal temperature (23° C.) and pressure (760 mm. of mercury).

A second example of oxygen conservation equipment is shown in FIG. 2 wherein in place of the stored oxygen supply used in FIG. 1, a mixture of gases is generated containing about 50% oxygen by the use of the two-stage permselective membrane oxygen enrichment unit 41. Similarly fuel cells operated in reverse can be used for the generation of oxygen for the instant invention. Feed back gas flow from rebreather 42 is cycled into the operation of unit 41 as described below.

Thus, ambient air (about 21% oxygen) is pressurized in compressor 43 to about 300 p.s.i.a. (pounds per square inch absolute) before being admitted to gas separator 44, the first stage of the permselective membrane oxygen enrichment system. The oxygen-enriched exhaust gas from gas separator 46, the second stage of the system, is added thereto, thereby increasing the oxygen content of the ambient air to provide a gas mixture entering gas separator 44 of about 23.1% oxygen. Within volume 47 of stage 44 the gas mixture comes into contact with permselective membrane 48 whereby gaseous components can selectively permeate therethrough. Since it is the object of this treatment to most effectively separate the oxygen from the other gaseous components under the driving force of the substantial difference in total (and, thereby, partial) pressure it is necessary to select a permeable membrane material having both high selectivity and high permeability for oxygen and properly supported against the pressure application. Dimethylsilicone rubber and poly-(2,6-dimethyl-1,4-phenylene) ether films are examples of suitable membranes for tihs purpose. Chamber 49 to which the oxygen-rich gaseous component passes through membrane 48, is at ambient pressure. The oxygen enriched gas collected in chamber 49 is merged with recirculated purged gas mixture from rebreather 42 and enters compressor 51 from which it exits at a pressure of about 300 p.s.i.a. constituting the feed gas to volume 52 of the second stage unit 46 (the high pressure side of permselective membrane 53). Membrane 53 may be of a different material from membrane 48, if advantageous to the design. The highly oxygen-enriched gas mixture produced in second stage 46 is collected in volume 54 (the low pressure side of membrane 53). From volume 54 the highly oxygen-enriched product passes via conduit 56 to demand regulator 57, while the gaseous components on the high pressure side of membrane 53 are recirculated to enter stage 44 has been described above.

The gaseous product from the first stage of enrichment is a mixture of oxygen, nitrogen and some carbon dioxide containing about 33% oxygen. This gas mixture is mixed and compressed with another gas mixture containing about 43.5% oxygen, which other mixture is recovered after purging in rebreather 42 to provide an aggregate containing about 37.7% oxygen admitted to second stage 46. The oxygen-depleted gas flow (about 25.3% oxygen) exiting from volume 52 is conducted to the input to chamber 47. The oxygen-enriched gas flow from volume 54 containing about 49.5% oxygen become available for respiration on demand via regulator 57. In case the mask is not being employed, the compressors need not be shut down for the gas flow is free to circulate without loss via bypass 58.

In the same manner as is illustrated in FIG. 1, the wearer of mask 59 receives a gas mixture containing 49.5% oxygen, 49.5% nitrogen and about 1% $CO_2$ (dry volume). Exhaled gases are isolated from this inhaled gas mixture and are conducted from mask 59 to rebreather unit 42, which contains permselective membrane 60. Both carbon dioxide gas and water vapor are purged from the exhaled gases as has been described in connection with the structure shown in FIG. 1. In the arrangement of FIG. 2 there is no need to bleed the system to remove excess nitrogen as any nitrogen entering chamber 61 through membrane 60 is simply carried through conduit 62 to the second stage 46, is exhausted from chamber 52 as the feed gas for stage 44 and is then discharged from chamber 47 to the atmosphere. Blower 63 is similar to blower 23 of FIG. 1.

A single unit, such as is schematically illustrated in FIG. 2, capable of meeting the oxygen demands of a single man would weight under 50 pounds.

Therefore, a simple, effective rebreather device has been illustrated in two oxygen supply systems, which device is capable of successfully extending by a significant factor, the utilization obtainable from a given quantity of oxygen gas.

Although the use of this invention has been described in connection with respiration by humans, it is apparent that any vertebrate can be supplied oxygen in the same manner and such a device may find application in veterinary medicine as well as in the exemplary application described.

Modifications and variations of this invention are possible in the light of the above teachings. It is, therefore, to be understood that within the scope of the appended claims the invention may be practiced otherwise than as specifically described.

What we claim as new and desire to secure by Letters Patent of the United States is:

1. In a system for the distribution of oxygen to, and waste gases from, the respiratory organs of a vertebrate, wherein a respirator adapted to be won by the vertebrate is connected to and in communication with means for supplying a high oxygen content oxygen/nitrogen gas mixture and said respirator is separately connected to means for conducting away gaseous exhalant comprising waste gases and surplus oxygen expelled by said respiratory organs from said respirator, the improvement comprising:
    (a) a walled chamber having both impermeable wall area and permeable, non-porous wall area having a $CO_2/O_2$ permeability ratio of at least about 5,
        (1) said chamber having the interior thereof in communication with the means for conducting exhalant from the respirator,
        (2) said permeable, non-porous wall area having the outer surface thereof in communication with the ambient atmosphere,
    (b) means for circulating atmospheric gases over said outer surface of said permeable wall area to prevent the build-up of high concentration of carbon dioxide over said outer surface, and
    (c) means for recirculating gaseous medium from said chamber to said means for supplying the high oxygen content gas mixture,
        (1) said recirculating means being in communication with and interconnecting the interior of said chamber and the means for supplying the high oxygen content gas mixture,
whereby the gas mixture can be added to enrich the oxygen content of the recirculated gaseous medium.

2. The improvement substantially as recited in claim 1 wherein the permeable, non-porous wall area is dimethylsilicone membrane protected on at least one side thereof against abrasion and supported against rupture.

3. The improvement substantially as recited in claim 1 wherein the means for supplying high oxygen content gas is a pressurized bottle of oxygen/nitrogen and conduits connecting said bottle to the respirator.

4. The improvement substantially as recited in claim 1 wherein the means for supplying high oxygen content gas mixture is a two-stage oxygen enriching unit and conduits connecting said unit to the respirator.

5. The improvement substantially as recited in claim 1 wherein the permeable, non-porous wall area comprises a modified cellulosic ester film protected on at least one side thereof against abrasion and supported against rupture.

References Cited

UNITED STATES PATENTS

| | | | |
|---|---|---|---|
| 2,966,235 | 12/1960 | Kammermeyer | 55—16 |
| 3,200,816 | 8/1965 | Bartlett | 128—142.2 |
| 3,228,394 | 1/1966 | Ayres | 128—147 |
| 3,256,675 | 6/1966 | Robb | 55—16 |
| 3,355,861 | 12/1967 | Webb | 55—158 |
| 3,369,343 | 2/1968 | Robb | 55—16 |
| 3,403,612 | 10/1968 | Swet et al. | 98—1.5 |

DALTON L. TRULUCK, Primary Examiner

U.S. Cl. X.R.

55—158